US012793700B2

(12) United States Patent
Kim et al.

(10) Patent No.: US 12,793,700 B2
(45) Date of Patent: Nov. 10, 2026

(54) SPEECH SYNTHESIS SYSTEM AND METHOD WITH ADJUSTABLE UTTERANCE LENGTH

(71) Applicant: Korea Electronics Technology Institute, Seongnam-si (KR)

(72) Inventors: Tae Woo Kim, Seongnam-si (KR); Choong Sang Cho, Seongnam-si (KR); Young Han Lee, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 371 days.

(21) Appl. No.: 18/390,216

(22) Filed: Dec. 20, 2023

(65) Prior Publication Data

US 2025/0149023 A1 May 8, 2025

(30) Foreign Application Priority Data

Nov. 3, 2023 (KR) ........................ 10-2023-0150659

(51) Int. Cl.
*G10L 13/10* (2013.01)

(52) U.S. Cl.
CPC ........ *G10L 13/10* (2013.01); *G10L 2013/105* (2013.01)

(58) Field of Classification Search
CPC ... G10L 13/10; G10L 2013/105; G10L 13/08; G10L 13/047; G10L 25/18; G10L 2015/025; G06F 40/279
USPC .......................................................... 704/258
See application file for complete search history.

(56) References Cited

U.S. PATENT DOCUMENTS

2024/0155071 A1* 5/2024 Gupta .................. H04N 7/0117

FOREIGN PATENT DOCUMENTS

JP 2023-14765 A 1/2023
JP 2023014765 A * 1/2023

OTHER PUBLICATIONS

A3T: Alignment-Aware Acoustic and Text Pretraining for Speech Synthesis and Editing (Year: 2022).*
Bai, He, et al. "A$^3$T: Alignment-aware acoustic and text pretraining for speech synthesis and editing." International Conference on Machine Learning. PMLR, 2022. (pp. 1-13).
Korean Office Action issued on Jan. 24, 2025, in corresponding Korean Patent Application No. 10-2023-0150659. (5pages in English, 6pages in Korean).

* cited by examiner

*Primary Examiner* — Thierry L Pham
(74) *Attorney, Agent, or Firm* — NSIP Law

(57) ABSTRACT

There is provided a speech synthesis system and method with an adjustable utterance length. The speech synthesis method according to an embodiment predicts a duration of each phoneme corresponding to a speech mask from the speech mask and a text to be synthesized with the speech mask, encodes the text to be synthesized and extracts a text sequence which is expressed by feature information of the text, generates a speech frame sequence by regulating a length of each phoneme of the text sequence according to the predicted duration of each phoneme corresponding to the speech mask, and synthesizes a speech from the generated speech frame sequence. Accordingly, a length of a speech to be synthesized can be freely regulated as a user desires by regulating a length of a speech mask.

17 Claims, 5 Drawing Sheets

SPEECH SYNTHESIS SYSTEM AND METHOD WITH ADJUSTABLE UTTERANCE LENGTH

CROSS-REFERENCE TO RELATED APPLICATION(S) AND CLAIM OF PRIORITY

This application is based on and claims priority under 35 U.S.C. § 119 to Korean Patent Application No. 10-2023-0150659, filed on Nov. 3, 2023, in the Korean Intellectual Property Office, the disclosure of which is herein incorporated by reference in its entirety.

BACKGROUND

Field

The disclosure relates to an artificial intelligence (AI)-based speech synthesis technology, and more particularly, to a speech synthesis system and method which receive a text and generates a corresponding speech by using an AI neural network.

Description of Related Art

Thanks to constant advancements in speech synthesis technologies, various technologies related to speech generation have been innovatively developed. Technologies have been developed with the aim of providing more natural speeches to users. However, related-art speech synthesis systems still have difficulty in generating natural speeches within a defined utterance time.

An autoregressive speech synthesis system (autoregressive text-to-speech (TTS) system) may have difficulty in regulating an utterance length since a last token is generated depending on previous tokens in generating speeches.

A non-autoregressive speech synthesis system (non-autoregressive TTS system) generates speeches by predicting a duration of each phoneme and extending a length of a text sequence to a sequence of a speech characteristic. However, it is still difficult to acquire a natural speech of a desired total length due to inaccuracy in predicting a duration of each phoneme.

SUMMARY

The disclosure has been developed in order to solve the above-described problems, and an object of the disclosure is to provide a speech synthesis system and method which generates a natural speech within an utterance length desired by a user, as a solution for overcoming difficulty and inaccuracy in regulating an utterance length, which is a problem of related-art speech synthesis technologies, and for more exactly and smoothly generating a speech of an utterance length desired by users.

According to an embodiment of the disclosure to achieve the above-described object, a speech synthesis method may include: a step of predicting a duration of each phoneme corresponding to a speech mask from the speech mask and a text to be synthesized with the speech mask; a step of encoding the text to be synthesized and extracting a text sequence which is expressed by feature information of the text; a step of generating a speech frame sequence by regulating a length of each phoneme of the text sequence according to the predicted duration of each phoneme corresponding to the speech mask; and a step of synthesizing a speech from the generated speech frame sequence.

A length of the speech mask may be a length of the speech which is synthesized at the step of synthesizing.

The length of the speech mask may be set by a user.

The speech mask may be a zero padding vector of the length of the speech to be synthesized.

The step of predicting may include predicting a duration of each phoneme corresponding to a speech prompt and a duration of each phoneme corresponding to the speech mask, from the speech prompt, a text prompt which is text information of the speech prompt, the speech mask, and the text to be synthesized with the speech mask.

The step of predicting may include concatenating the speech prompt, the text prompt, the speech mask, and the text to be synthesized, and inputting the concatenated information to a prediction model which is trained to predict a duration of a phoneme.

The step of predicting may include predicting a speech frame-phoneme alignment on the speech mask.

The speech prompt may be expressed by a speech feature vector, and the speech feature vector may be one of MFCC, a Mel-spectrogram, a spectrogram.

The step of generating the speech frame sequence may include regulating the length by up-sampling each phoneme of the text sequence according to the predicted duration of each phoneme corresponding to the speech mask.

According to another aspect of the disclosure, there is provided a speech synthesis system including: a prediction unit configured to predict a duration of each phoneme corresponding to a speech mask from the speech mask and a text to be synthesized with the speech mask; and a synthesis unit configured to encode the text to be synthesized and extract a text sequence which is expressed by feature information of the text, to generate a speech frame sequence by regulating a length of each phoneme of the text sequence according to the predicted duration of each phoneme corresponding to the speech mask, and to synthesize a speech from the generated speech frame sequence.

According to still another aspect of the disclosure, there is provided a phoneme duration prediction method including: a step of receiving a speech mask and a text to be synthesized with the speech mask; and a step of predicting a duration of each phoneme corresponding to the speech mask from the speech mask and the text to be synthesized, and a length of the speech mask may be a length of a speech that is synthesized from the text to be synthesized.

As described above, according to embodiments of the disclosure, a length of a speech to be synthesized can be freely regulated as a user desires by regulating a length of a speech mask.

According to embodiments of the disclosure, a natural speech that is more consistent with intent of a user and a context can be generated by combining a speech/text prompt and a speech mask and a text.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiment of the disclosure provide a speech synthesis system and method with an adjustable utterance length. The disclosure relates to a technology for synthesizing a natural speech within a length desired by a user by using a speech/text prompt, a speech mask.

In embodiments of the disclosure, durations of phonemes within a speech mask section are predicted by concatenating a speech/text prompt, the speech mask and a text and using the concatenated information as an input to an AI-based duration prediction model, and a speech is generated in a speech synthesis model by using the durations of the phonemes. In this case, a length of the speech mask is selected as desired by a user, so that the user can regulate a length of a synthesized speech exactly as the user desires.

Figure 1:
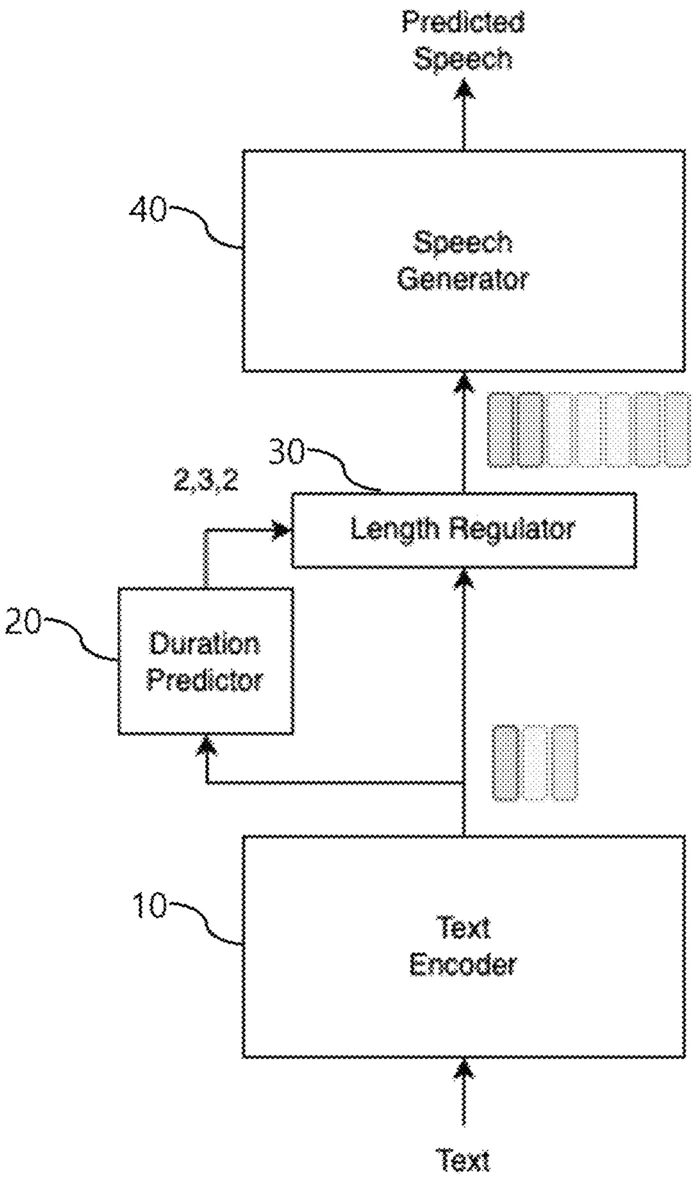
FIG. 1 is a view illustrating a non-autoregressive speech synthesis system to which an embodiment of the disclosure is applicable.

FIG. 1 illustrates a non-autoregressive speech synthesis system to which an embodiment of the disclosure is applicable. A text to be synthesized is inputted and inter-text rhythm information is predicted by a text encoder 10, and the number of speech frames corresponding to a text sequence is predicted by a duration predictor 20, and is up-sampled by a length regulator 30. A speech is synthesized by a speech generator 40.

The non-autoregressive speech synthesis system illustrated in FIG. 1 does not consider a length of an entire utterance in predicting a duration of a phoneme of a text to be synthesized by the duration predictor 20. The sum of frames of all phonemes refers to the number of frames of an entire utterance, and a method employed in this system is linearly reducing or increasing the number of frames of each phoneme to regulate the length of the entire utterance as a user desires. However, this method may lose naturalness with rhythm of a speech to be generated.

Figure 2:
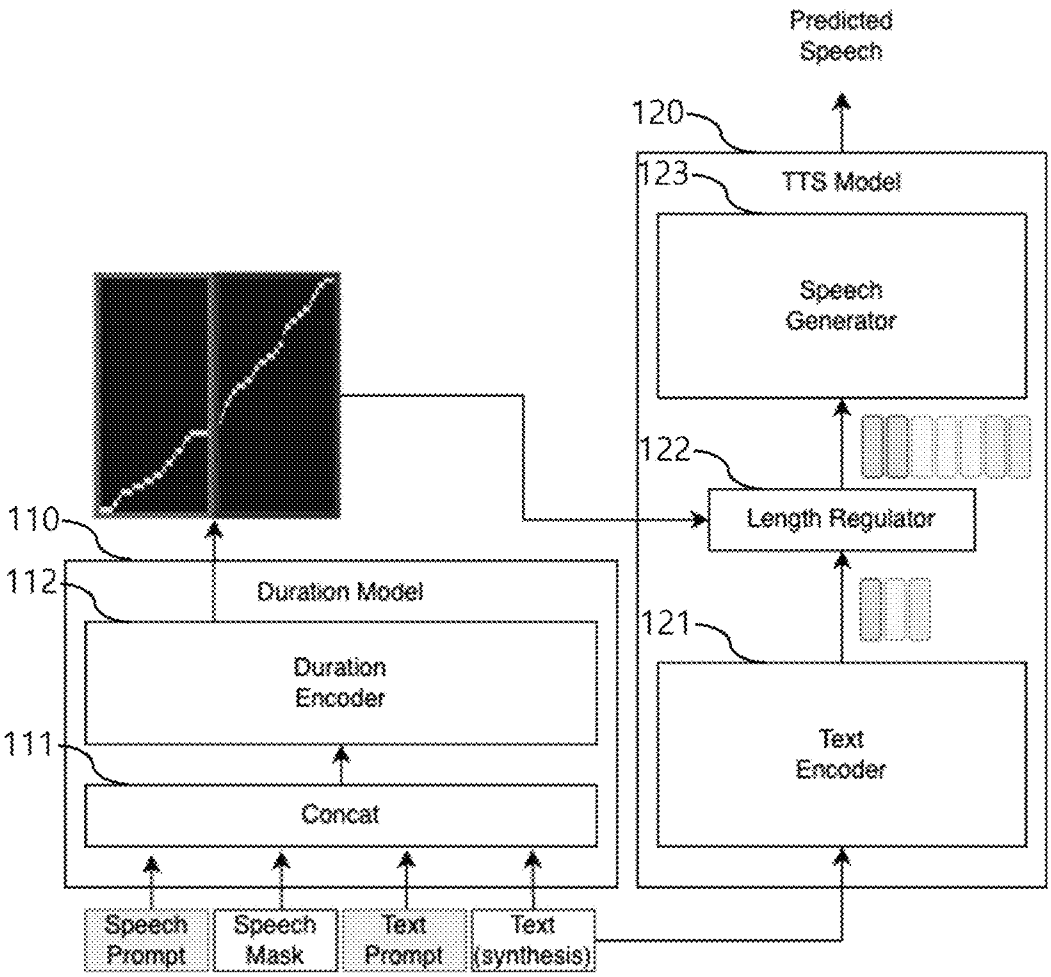
FIG. 2 is a view illustrating a non-autoregressive speech synthesis system with an adjustable utterance length according to an embodiment of the disclosure.

FIG. 2 is a view illustrating a configuration of a non-autoregressive speech synthesis system with an adjustable utterance length according to an embodiment of the disclosure. As shown in FIG. 2, the speech synthesis system according to an embodiment may include a duration prediction model 110 and a text-to-speech (TTS) model 120.

The duration prediction model 110 may be an AI neural network model for predicting a duration of each phoneme of a speech to be synthesized from a text, or a processor to drive the AI neural network model, and the TTS model 102 may be an AI neural network model for synthesizing a speech from a text to be synthesized, or a processor for driving the AI neural network model.

The duration prediction model 110 may include a concat module 111 and a duration encoder 112.

The concat module 111 is an input means for concatenating a speech prompt, a text prompt which is text information of the speech prompt, a speech mask, and a text ([Text (synthesis)] to be synthesized with the speech mask, which are inputted, and inputting the concatenated information to the duration encoder 112.

The speech prompt is expressed by a speech feature vector, and specifically, may use a Mel-frequency cepstral coefficients (MFCC), a Mel-spectrogram, a spectrogram.

A length of the speech mask corresponds to a length of a speech to be synthesized from the text to be synthesized, and the speech mask may use a zero padding vector of the corresponding length. The length of the speech to be synthesized may be determined by the length of the speech mask, and the length of the speech mask may be set by a user.

The duration encoder 112 is an AI neural network that is trained to encode a speech prompt, a text prompt, a speech mask and a text to be synthesized, and to predict a duration of each phoneme (blue box) corresponding to the speech prompt and a duration of each phoneme (red box) corresponding to the speech mask.

Figure 3:
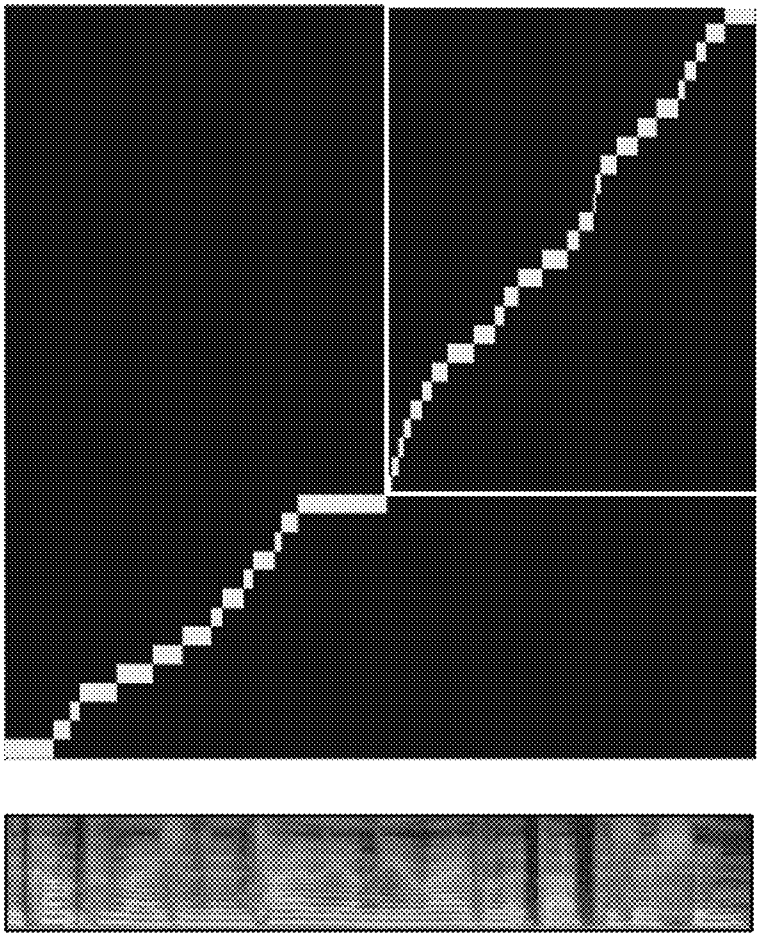
FIG. 3 is a view illustrating an example of a speech frame-phoneme alignment.

Phoneme duration information predicted in the duration encoder 112 has a speech frame (speech)-phoneme (text) alignment format. FIG. 3 is an enlarged view of the phoneme duration information. Herein, the x-axis indicates a speech frame and the y-axis indicates a phoneme, and FIG. 3 illustrates frames corresponding to respective phonemes.

The TTS model 120 may include a text encoder 121, a length regulator 122, and a speech generator 123.

The text encoder 121 encodes a text to be synthesized and extracts a text sequence which is expressed by feature information (inter-text rhythm information) of the text.

The length regulator 122 generates a speech frame sequence by regulating a length by up-sampling each phoneme of the text sequence according to the duration of each phoneme corresponding to the speech mask, predicted by the duration encoder 112 of the duration prediction model 110.

The speech generator 123 is an AI neural network model that is trained to synthesize a speech from a speech frame sequence having a duration of each phoneme regulated by the length regulator 122. A length of a speech generated by the speech generator 123 is the same as a length of the speech mask.

Figure 4:
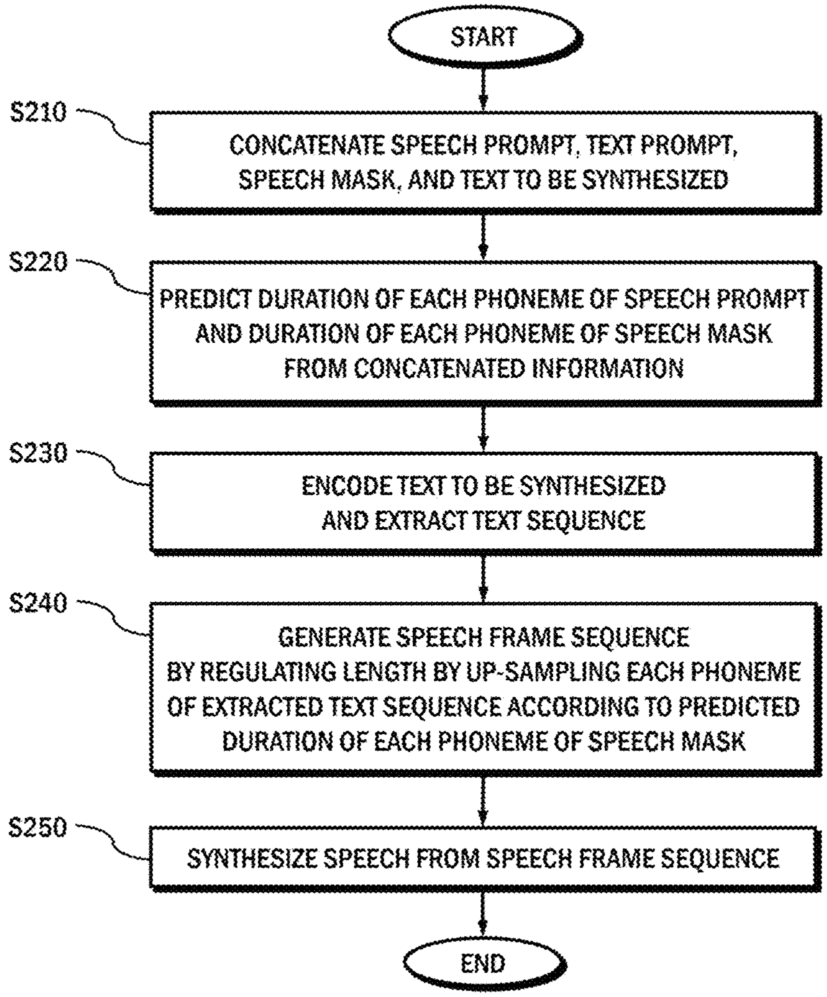
FIG. 4 is a view illustrating a speech synthesis method with an adjustable utterance length according to another embodiment of the disclosure.

FIG. 4 is a view provided to explain a speech synthesis method with an adjustable utterance length according to another embodiment of the disclosure.

As shown in FIG. 4, the concat module 111 of the duration prediction model 110 concatenates a speech prompt and a text prompt thereon, and a speech mask and a text to be synthesized with the speech mask (S210).

Then, the duration encoder 112 may predict a duration of each phoneme corresponding to the speech prompt and a duration of each phoneme corresponding to the speech mask by encoding the information concatenated in step S210 (S220).

The text encoder 121 of the TTS model 120 may encode the text to be synthesized and may extract a text sequence which expresses feature information of the text (S230).

Then, the length regulator 122 generates a speech frame sequence by regulating a length by up-sampling each phoneme of the text sequence extracted in step S230 according to the duration of each phoneme corresponding to the speech mask, predicted in step S220 (S240).

The speech generator 123 synthesizes a speech from the speech frame sequence which has the duration of each phoneme regulated at step S240 (S250).

Figure 5:
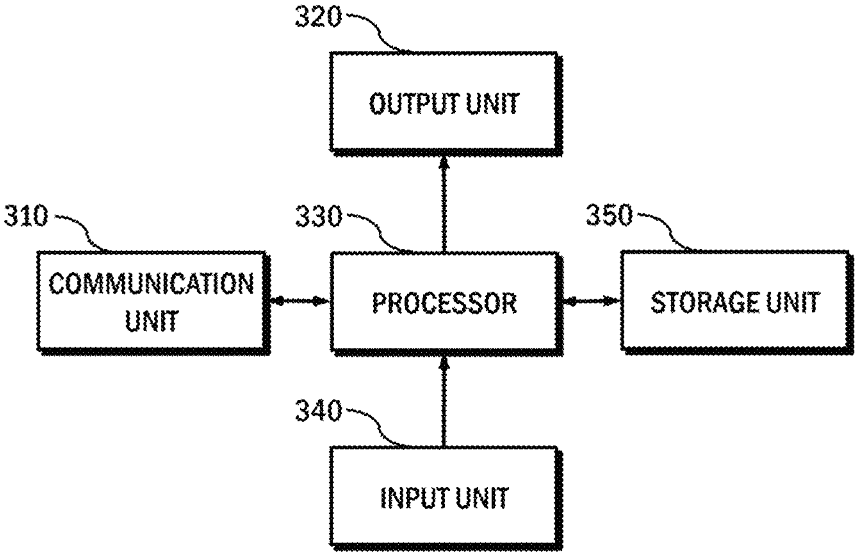
FIG. 5 is a view illustrating a hardware configuration of a speech synthesis system according to still another embodiment of the disclosure.

FIG. 5 is a view illustrating a hardware configuration of a speech synthesis system according to still another embodiment of the disclosure. As shown in FIG. 5, the speech synthesis system according to still another embodiment may be implemented by a computing system which includes a communication unit 310, an output unit 320, a processor 330, an input unit 340, and a storage unit 350.

The communication unit 310 is a communication interface for connecting to an external network or an external device. The output unit 320 is an output means for displaying a result of computing by the processor 330, and the input unit 340 is a user interface for receiving a user command and delivering the user command to the processor 330.

The processor 330 predicts a duration of each phoneme corresponding to a speech mask according to the procedure shown in FIG. 4, and synthesizes a speech from a text based on a result of prediction. The storage unit 350 provides a storage space which is necessary for functions and operation of the processor 330.

Up to now, a speech synthesis system and method with an adjustable utterance length has been described with reference to preferred embodiments.

In the above-described embodiments, there is provided a technology for synthesizing a speech by predicting a duration of a phoneme by using a speech prompt, a speech mask, a text prompt, and a text to be synthesized as an input to an AI neural network, up-sampling a text sequence to a speech frame sequence through a length regulator of a TTS model by using length information of a section of the speech mask.

Through the method and the system described above, difficulty and inaccuracy in regulating an utterance length, which may occur in related-art speech synthesis technologies, can be overcome and a speech of an utterance length desired by a user can be more exactly and smoothly generated.

In addition, a natural speech that is more consistent with intent of a user and a context can be generated by combining a speech/text prompt and a speech mask and a text.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A speech synthesis method comprising:

predicting a duration of each phoneme corresponding to a speech mask from the speech mask and a text to be synthesized with the speech mask, wherein the speech mask is a zero padding vector of a length of a speech to be synthesized;

encoding the text to be synthesized and extracting a text sequence which is expressed by feature information of the text;

generating a speech frame sequence by regulating a length of each phoneme of the text sequence according to the predicted duration of each phoneme corresponding to the speech mask; and synthesizing the speech from the generated speech frame sequence.

2. The speech synthesis method of claim 1, wherein a length of the speech mask is a length of the speech which is synthesized at the synthesizing.

3. The speech synthesis method of claim 2, wherein the length of the speech mask is set by a user.

4. The speech synthesis method of claim 1, wherein the predicting comprises predicting a duration of each phoneme corresponding to a speech prompt and a duration of each phoneme corresponding to the speech mask, from the speech prompt, a text prompt which is text information of the speech prompt, the speech mask, and the text to be synthesized with the speech mask.

5. The speech synthesis method of claim 4, wherein the predicting comprises concatenating the speech prompt, the text prompt, the speech mask, and the text to be synthesized, and inputting the concatenated information to a prediction model which is trained to predict a duration of a phoneme.

6. The speech synthesis method of claim 4, wherein the predicting comprises predicting a speech frame-phoneme alignment on the speech mask.

7. The speech synthesis method of claim 4, wherein the speech prompt is expressed by a speech feature vector, and wherein the speech feature vector is one of MFCC, a Mel-spectrogram, a spectrogram.

8. The speech synthesis method of claim 4, wherein the generating the speech frame sequence comprises regulating the length by up-sampling each phoneme of the text sequence according to the predicted duration of each phoneme corresponding to the speech mask.

9. A speech synthesis system comprising:

one or more processors configured to:

predict a duration of each phoneme corresponding to a speech mask from the speech mask and a text to be synthesized with the speech mask, wherein the speech mask is a zero padding vector of a length of a speech to be synthesized; and encode the text to be synthesized and extract a text sequence which is expressed by feature information of the text, generate a speech frame sequence by regulating a length of each phoneme of the text sequence according to the predicted duration of each phoneme corresponding to the speech mask, and synthesize the speech from the generated speech frame sequence.

10. A phoneme duration prediction method comprising:

receiving a speech mask and a text to be synthesized with the speech mask, wherein the speech mask is a zero padding vector of a length of a speech to be synthesized; and predicting a duration of each phoneme corresponding to the speech mask from the speech mask and the text to be synthesized, wherein a length of the speech mask is a length of a speech that is synthesized from the text to be synthesized.

11. The speech synthesis system of claim 9, wherein a length of the speech mask is a length of the speech which is synthesized at the synthesizing.

12. The speech synthesis system of claim 11, wherein the length of the speech mask is set by a user.

13. The speech synthesis system of claim 9, wherein, for the predicting, the one or more processors are configured to predict a duration of each phoneme corresponding to a speech prompt and a duration of each phoneme corresponding to the speech mask, from the speech prompt, a text prompt which is text information of the speech prompt, the speech mask, and the text to be synthesized with the speech mask.

14. The speech synthesis system of claim 13, wherein, for the predicting, the one or more processors are configured to concatenate the speech prompt, the text prompt, the speech mask, and the text to be synthesized, and input the concatenated information to a prediction model which is trained to predict a duration of a phoneme.

15. The speech synthesis system of claim 13, wherein, for the predicting, the one or more processors are configured to predict a speech frame-phoneme alignment on the speech mask.

16. The speech synthesis system of claim 13, wherein the speech prompt is expressed by a speech feature vector, and wherein the speech feature vector is one of MFCC, a Mel-spectrogram, a spectrogram.

17. The speech synthesis system of claim 13, wherein, for the generating the speech frame sequence, the one or more processors are configured to regulate the length by upsampling each phoneme of the text sequence according to the predicted duration of each phoneme corresponding to the speech mask.

* * * * *